US011840110B2

(12) United States Patent
Peters et al.

(10) Patent No.: US 11,840,110 B2
(45) Date of Patent: Dec. 12, 2023

(54) SECURITY DOCUMENT AND METHOD FOR THE AUTHENTICATION THEREOF

(71) Applicant: OVD Kinegram AG, Zug (CH)

(72) Inventors: John Anthony Peters, Au-Zurich (CH); Achim Hansen, Zug (CH); Rene Schadler, Baar (CH)

(73) Assignee: OVD Kinegram AG

( * ) Notice: Subject to any disclaimer, the term of this patent is extended or adjusted under 35 U.S.C. 154(b) by 28 days.

(21) Appl. No.: 17/362,007

(22) Filed: Jun. 29, 2021

(65) Prior Publication Data

US 2021/0323337 A1  Oct. 21, 2021

Related U.S. Application Data

(63) Continuation of application No. 16/081,506, filed as application No. PCT/EP2017/053421 on Feb. 15, 2017, now Pat. No. 11,077,697.

(30) Foreign Application Priority Data

Mar. 2, 2016  (DE) .......................... 102016103694.3
Jul. 20, 2016  (DE) .......................... 102016113335.3

(51) Int. Cl.
*G06K 19/06* (2006.01)
*B42D 25/305* (2014.01)
(Continued)

(52) U.S. Cl.
CPC ......... *B42D 25/305* (2014.10); *B42D 25/309* (2014.10); *B42D 25/313* (2014.10); *B42D 25/324* (2014.10); *B42D 25/328* (2014.10); *B42D 25/36* (2014.10); *B42D 25/369* (2014.10); *B42D 25/373* (2014.10); *B42D 25/382* (2014.10); *B42D 25/387* (2014.10);
(Continued)

(58) Field of Classification Search
CPC .. B42D 25/305; B42D 25/309; B42D 25/328; G06K 19/025; G06K 19/0727; G06K 19/06009
USPC .................................................. 235/487, 494
See application file for complete search history.

(56) References Cited

U.S. PATENT DOCUMENTS

2007/0016790 A1  1/2007  Brundage et al.
2009/0072526 A1  3/2009  Peters et al.
(Continued)

FOREIGN PATENT DOCUMENTS

DE  60211307 T2  5/2007
DE  102007044992 B3  12/2008
(Continued)

OTHER PUBLICATIONS

ICAO, "Machine Readable Travel Documents" Seventh Edition, Part 3: Specifications Comon to all MRTDS, Doc 9303, pp. 1-86 (2015).
ISO/IEC International Standard, Second Edition Sep. 1, 2006, "Information Technology—Automatic Identification and Data Capture Techniques—QR Code 2005 Bar Code Symbology Specification", Reference No. ISO/IEC 18004:2006(E), pp. 1-124 (2006).
(Continued)

*Primary Examiner* — Jamara A Franklin
(74) *Attorney, Agent, or Firm* — Hoffmann & Baron, LLP

(57) ABSTRACT

A security document with a first security element, which includes a first item of visually recognizable and in particular machine-readable information, and a second security element, which includes a second item of in particular machine-readable information which can be used to verify the first item of information. A method for the authentication thereof is also described.

19 Claims, 8 Drawing Sheets

(51) Int. Cl.
| | |
|---|---|
| *B42D 25/309* | (2014.01) |
| *B42D 25/328* | (2014.01) |
| *B42D 25/373* | (2014.01) |
| *G07D 7/01* | (2016.01) |
| *G07D 7/004* | (2016.01) |
| *G07D 7/00* | (2016.01) |
| *B42D 25/387* | (2014.01) |
| *B42D 25/324* | (2014.01) |
| *B42D 25/36* | (2014.01) |
| *B42D 25/369* | (2014.01) |
| *B42D 25/313* | (2014.01) |
| *B42D 25/382* | (2014.01) |
| *G06K 19/02* | (2006.01) |
| *G06K 19/07* | (2006.01) |

(52) U.S. Cl.
CPC ..... *G06K 19/025* (2013.01); *G06K 19/06009* (2013.01); *G06K 19/0727* (2013.01); *G07D 7/003* (2017.05); *G07D 7/004* (2013.01); *G07D 7/01* (2017.05)

(56) References Cited

U.S. PATENT DOCUMENTS

| | | | |
|---|---|---|---|
| 2013/0173484 A1* | 7/2013 | Wesby | G06K 7/1417 |
| | | | 705/318 |
| 2013/0214043 A1 | 8/2013 | Kong et al. | |
| 2015/0269375 A1 | 9/2015 | Chapman | |

FOREIGN PATENT DOCUMENTS

| | | |
|---|---|---|
| DE | 102007044486 A1 | 3/2009 |
| DE | 102014207323 A1 | 10/2015 |
| EP | 1139302 A1 | 10/2001 |
| EP | 2743893 A1 | 6/2014 |
| WO | WO2012035306 A1 | 3/2012 |

OTHER PUBLICATIONS

German International Search Report for corresponding International Application PCT/EP2017/053421, pp. 1-6 (dated May 26, 2017.
International Search Report for International Application PCT/EP2017/053421, pp. 1-14 (dated Dec. 13, 2016).

\* cited by examiner

SECURITY DOCUMENT AND METHOD FOR THE AUTHENTICATION THEREOF

This application is a continuation application of U.S. application Ser. No. 16/081,506, filed Aug. 31, 2018, which claims priority based on an International Application filed under the Patent Cooperation Treaty, PCT/EP2017/053421, filed Feb. 15, 2017, which claims priority to DE102016103694.3, filed Mar. 2, 2016 and DE102016113335.3, filed Jul. 20, 2016.

BACKGROUND OF THE INVENTION

The invention relates to a security document and a method for the authentication thereof.

For the authentication of security documents, such as for example identity documents, passports, visas and the like, as a rule physical features are used. These can be for example security prints and/or optically variable security elements installed on the security document and/or in the security document, such as for example holograms.

One problem here is that a person who is checking such a document has to know what such a security element looks like in the original state and how it behaves for example when viewed from different angles. Because of the large number of different security documents, however, this knowledge cannot always be assumed, with the result that there is a danger that forged documents are accidentally assessed as authentic.

It is furthermore becoming apparent that digital information is increasingly being used to protect and verify such documents. This information can be verified by machine, with the result that the above-named problem does not occur. However, as a rule a comparison with a database is needed here, with the result that such methods can only be used when a corresponding infrastructure is available.

Documents with digital information therefore still also have to contain this information in visual form, so that an authentication is still possible, for example, in the case of a network failure. However, this in turn opens up scope for manipulations on the document, as it cannot be ensured here that the digital information and the visual information match.

SUMMARY OF THE INVENTION

The object of the present invention is to provide a security document and a method for the authentication thereof which make it possible to reliably integrate digital and physical security features.

This object is achieved by the subject of claim 1 and the subject of claim 14.

Such a security document comprises a first security element, which comprises at least one first item of visually recognizable and in particular machine-readable information, and a second security element, which comprises at least one second item of in particular machine-readable information which can be used to verify the first item of information.

For the authentication of such a security document, a method with the following steps is suitable:
reading a first item of visually recognizable and in particular machine-readable information from a first security element;
reading a second item of in particular machine-readable information from a second security element;
verifying the first item of information by reference to the second item of information.

By an item of visually recognizable information is meant here an item of information which is visible to the naked eye and can be interpreted by a human observer without further aids. An item of machine-readable information is an item of information which can be read in a digital manner, either directly from a storage medium or using image- and/or character-recognition software. An item of information within the meaning of this application can also be a more complex dataset, but it can also be merely a part of a more comprehensive dataset.

Through the use of the second item of information to verify the first item of information, it can be ensured here that manipulations on the first item of information can also be recognized without a network connection. In order to forge such a security document, a forger would have to manipulate both the first and the second item of information. As the second item of information is preferably present digitally, a particularly high level of protection against forgery can be achieved by suitable encryption.

It is preferred if the first item of information comprises personalized data relating to a holder of the security document and/or an object associated with the security document.

This can be, for example, the name of an identity card holder, biometric data, passport photographs, issue and validity dates, nationality, a chassis number or type classification of a motor vehicle associated with the security document, or the like.

Furthermore, it is expedient if the first security element comprises an in particular laser-engraved inscription and/or a photograph and/or a machine-readable zone (MRZ) of an identity document and/or a storage device, in particular an RFID chip.

These elements are preferably readable directly visually or, in the case of an RFID chip, readable through access by means of a reader, in particular by means of a hand-held device. By a machine-readable zone is meant here an area of the document which complies with ICAO document 9303, part 3.

It is advantageous if the second security element is formed as a code, in particular as a one- or two-dimensional barcode, in particular as a DataMatrix code, QR code, Aztec code, UPC (Universal Product Code), Code 128, Code 39 or PDF417 code. Such codes can preferably be formed as a diffractive code. Further encoding possibilities for the second security element are for example surface patterns, dot patterns, in particular pixel patterns, numerical codes, special proprietary barcodes such as e.g. color barcodes or three-dimensional barcodes, codes which are written into storage media such as e.g. in volume holograms. Codes based on magnetic storage media (magnetic strips, magnetic inks) as well as codes applied by fluorescent inks (for example UV-fluorescent inks), IR upconverters, polarizing optical elements can alternatively or additionally used. For the optical or electronic reading, additional methods may be required, such as UV illumination, electronic readers for magnetic codes, optical filters which are placed on the document or which are held e.g. in front of the camera lens (e.g. polarization filters, moiré analyzers).

A high information density can hereby be provided in a small space. In particular in the case of a diffractive barcode, there is at the same time an optical security effect which additionally impedes forgery. The diffractive optical effect in the case of a diffractive barcode can also provide the actual encoding or form an additional item of encoded information or provide a merely decorative optical effect which contains no encoded information. The decorative effect can also be combined with an item of encoded information.

The QR code defined in ISO/IEC 18004 and can consist of 21×21 to 177×177 modules in a two-dimensional matrix. Alphanumeric data or also 8-bit byte data can be encrypted in this matrix. For example, up to 7089 numerical characters, up to 4296 alphanumeric characters or up to 2953 8-bit byte characters can be encrypted, in each case in the maximum matrix size of 177×177 modules. It is also possible to store correspondingly less data and to combine the data in the matrix with error-correction data. The micro QR code with a size between 11×11 and 17×17 modules records up to 35 characters, in the case of a margin width of at least two modules.

The second item of information can also be present for example in the form of OCR text, which is machine-readable. For example, a security document can contain an OCR-B text as the second item of information, as is defined in ICAO doc 9303 for a machine-readable zone for Type 3 travel documents and contain 44 characters in two rows.

It is particularly advantageous if the second item of information comprises a key or a part of a key for decoding the first item of information.

A particularly high level of protection against forgery is achieved by such an encryption method. For example, the second item of information can be the public key of an asymmetric key pair, which acts as a digital signature for a part of the first item of information encoded with the private key of the key pair. It is then not possible to manipulate the first item of information without knowing the private key. For example, the Elliptic Curve Digital Signature Algorithm (ECDSA) and/or, for example, SHA-256 hash algorithm are particularly suitable.

It is further expedient if the second item of information comprises a checksum for the first item of information or parts of the first item of information.

Through such a checksum it is ensured that manipulations on the first item of information can be recognized immediately. For example, a checksum can comprise several check digits, which are each generated from individual biographical data elements of the security document, such as for example name, date of birth, etc. ICAO document 9303 as well as the equivalent ISO standard 7501, part 1-3 describe an example of a standardized formula for calculating such check digits. However, non-standardized and optionally confidential methods can also be used.

It is furthermore advantageous if the second item of information comprises a redundant reproduction of at least a part of the first item of information. A manipulation of the first item of information can also be immediately recognized hereby, as it would lead to inconsistencies with the second item of information.

In a further embodiment, the second item of information can comprise a password for database access and/or for access to an RFID chip. An additional external check of the document for its authenticity is thus possible.

The first and/or the second item of information preferably comprises biometric features, such as for example fingerprints, portrait photographs, iris scans, retina scans, palm vein scans.

The biometric features can preferably be present as a template and/or be stored in a template. A template is preferably a compressed data volume and/or a data volume reduced to the essential biometric features in terms of its information content, which is generated by applying algorithms to the biometric raw data (for example fingerprint, portrait photograph, iris scan, retina scan, palm vein scan).

The size of the data volume of a template is preferably between 100 bytes and 500 bytes, e.g. 256 bytes and preferably corresponds to the ISO standard for such templates.

Because of the small data volume, such a template can be stored and/or filed in a non-electronic memory, in particular in an optically readable code such as for example a barcode.

It is furthermore preferred if the second item of information comprises an item of information about a reference state of a security feature of the first security element.

In particular, a person who is checking the document can thus be shown what an authentic security feature has to look like, with the result that an accidental visual authentication of a forged document is prevented.

It is advantageous if the first and/or the second security element, individually or in combination, has at least one optically variable element. An optically variable element preferably comprises one or more of the following structures: a diffractive structure, a zero-order diffraction structure, a blazed grating, a macrostructure, in particular a lens structure or microprism structure, a mirror surface, a matte structure, in particular an anisotropic or isotropic matte structure, a volume hologram or a thin-film structure with color-change effect. A variety of appealing optical effects can hereby be achieved and the level of protection against forgery can be further increased.

Such optically variable elements or structures can only be reproduced with difficulty and therefore provide a particularly good level of protection against forgery. The optically variable element or the structures here thus represent in particular a security feature. The optically variable element can, however, also form and/or contain the first and/or the second item of information, in particular can contain it/them in an optically readable form, for example as a diffractive barcode.

It is particularly advantageous if such an optically variable element overlaps the first and/or the second item of information at least in areas, with the result that it is not possible to manipulate these items of information without destroying the optically variable element or the security feature.

However, it is also conceivable that the optically variable element is arranged adjacent, in particular directly adjacent, to the first and/or the second item of information.

The optically variable element can preferably overlap at least the first item of information at least in areas and adjoin, preferably directly adjoin, the second item of information. The exactly reversed case is also possible. Namely, that the optically variable element overlaps at least the second item of information in areas and adjoins, preferably directly adjoins, the first item of information.

It is further preferred if the first and/or the second security element comprises a reflective layer, in particular a whole-surface or partial metal layer and/or a whole-surface or partial layer made of a high refractive index (HRI) material. The reflective layer here is preferably present in the area of the optically variable element.

It is additionally expedient if the first and/or the second security element or the optically variable element comprises single- or multi-layered printed structures, in particular comprising colored, optically active and/or optically variable dyes and/or pigments.

Overall, such varied layer structures can be implemented which are both visually appealing and particularly secure against forgery.

It is advantageous if the first and the second security element are arranged adjacent, in particular directly adjacent, to each other.

The first and the second security element are preferably present as a combined security element and/or are present as a common patch. Thus, overall, they preferably form a unit and/or are formed by partial areas of a common layered body, in particular in the form of a patch, a transfer film, a laminating film or a security thread.

Through the adjacent design of the security elements or the unit preferably resulting therefrom, it is possible to apply the security elements or the combined security element being obtained therefrom to a substrate in only a single step.

In order to simplify the application of the security elements, it is advantageous if the first and second security elements are provided in a common transfer ply of a transfer film or in a laminating film.

However, it is also possible in principle that the first and the second security element can be arranged overlapping each other in the security document at least in areas. This is to be understood according to the invention as meaning that in a top view of the security document one security element at least partially overlaps or covers the other security element.

The first security element and/or the second security element can in each case have at least two partial areas. In each case the first or second item of information is preferably contained and/or stored in a first partial area. Adjacent to the first partial area and/or surrounding the first partial area, in particular directly adjacent and/or directly surrounding, a second partial area can be provided. Further, in particular optical, particularly preferably optically variable security features or elements are preferably provided in the second partial area.

It is advantageous if a second partial area of one security element, having in particular an optically variable element, overlaps and/or covers a first partial area of the other security element at least in areas. In particular, the second partial area of the second security element overlaps the first security element, particularly preferably the first partial area of the first security element and thus preferably the first item of information, at least in areas. It is hereby achieved that it is possible to manipulate the first item of information only by destroying the second partial area, in particular the optical element.

By adjacent is preferably meant a spacing at the boundary lines of the partial areas of less than 50 mm, further preferably of less than 10 mm, further preferably of less than 3 mm. By directly adjacent is preferably meant a spacing of the boundary lines of two partial areas of less than 1 mm, further preferably of less than 300 µm, further preferably an at least partially formed common boundary line between the partial areas.

The security document is preferably formed as an identity document, visa document, driver's license, motor vehicle registration document or the like.

It is particularly expedient if the reading of the at least one first and/or the at least one second item of information and/or the verification of the first item of information is carried out by means of a hand-held device, in particular a smartphone, PDA, tablet or the like. The reading of the first and/or the second item of information and/or the verification of the first item of information can also be effected with a reader which is coupled to a stationary computer or similar.

In this embodiment no special hardware is thus required, with the result that the authentication of the document is possible without trouble using hand-held devices customary in the trade.

It is advantageous if an individual image and/or an image sequence and/or a video of the security document is captured for the reading of the first and/or the second item of information.

In particular if an image sequence or a video is recorded, it is possible to also verify the presence of optically variable elements or optically variable security features, by recording the document for example from different angles and verifying the desired optical change of the optically variable element or of the security feature.

It is expedient in particular if, before or during the reading of the first and/or the second item of information, instructions for capturing the individual image, the image sequence or the video are displayed on a display of the hand-held device, which comprise in particular specifications with respect to a recording angle, a recording distance or the like.

It can thus be ensured that the user achieves a recording that can be evaluated well, with the result that errors in the verification because of recording artifacts can be prevented.

The instructions can additionally also contain information as to how e.g. illumination units of the reader (flash, integrated LEDs or use of the polarized light of the device display) are to be used for the check.

It is furthermore advantageous if, to verify the first item of information, a checksum of the first item of information is generated and compared with a reference checksum comprised by the second item of information.

In a further preferred embodiment, to verify the first item of information, at least an encrypted part of the first item of information is decrypted by means of a key comprised by the second item of information.

It is likewise possible that, to verify the first item of information, the first item of information or parts of the first item of information is compared with a redundant copy of the first item of information comprised by the second item of information.

As already explained above by reference to the security document, a manipulation on the first item of information can be immediately recognized through such a checksum and/or encryption and/or redundant information.

It is furthermore preferred if a password comprised by the second item of information is used as access authentication for a program of the hand-held device and/or a database stored on the hand-held device or on a computing machine different from the hand-held device. This makes an additional protection of the document possible. Even if a forger should succeed in manipulating the first and the second item of information, a further level of security can be introduced by the database, which is not accessible to the forger, by reference to which such a manipulation can be recognized if the information stored on and/or in the document is compared with the information in the database.

It is advantageous in particular if a third item of information is retrieved by reference to the first and/or the second item of information. This third item of information can be retrieved from a database stored on the hand-held device or on a computing machine different from the hand-held device. However, the third item of information can also be an item of information which is captured or recorded by the hand-held device. The capture of the information is preferably effected in direct connection with the first and/or the second item of information. This means that the capture of the third item of information is effected immediately before or after the reading of the first and/or the second item of information. For this, the hand-held device preferably has means for recording or capture. Cameras can advantageously be used for this.

This third item of information makes an authentication independent of the document possible and is not accessible to a potential forger.

It is expedient if the third item of information comprises a key or a part of a key for decoding the first item of information or, together with the second item of information, forms a key pair.

Alternatively or additionally, the third item of information can comprises a checksum for the first and/or the second item of information.

It is also possible here that the third item of information comprises a redundant reproduction of at least a part of the first item of information.

As already explained above by reference to the security document, a manipulation on the first item of information can be immediately recognized through such a checksum and/or encryption and/or redundant information.

Furthermore, the third item of information can also comprise a password for database access and/or for access to an RFID chip.

Further levels of security can be produced hereby, which, as already described, elude a potential forger's access.

It is furthermore expedient if the third item of information comprises an item of information about a reference state of a security feature of the first and/or the second security element.

This item of information can be used to support a machine authentication, or else also be provided to a user in order thus to make visual authentication reliably possible even if the reference state of the document is unknown.

In this case, it is particularly preferred if, by reference to the third item of information, an individual image and/or an image sequence and/or a video is displayed on a display of the hand-held device, which demonstrate a reference state of an in particular diffractive security feature of the first and/or the second security element. Audio reproductions in the form of instructions as to how a check is to be carried out or also what questions are to be asked of the person to be checked are also possible. These audio reproductions can also be "played aloud" in order to check e.g. whether the checked person has information in the context of the data listed on the document (example: in which federal state is your place of birth located?).

The user is thus shown what the individual security features of the document have to look like in the unmanipulated state, so that he can easily and reliably recognize forgeries.

It is advantageous in particular if the individual image and/or the image sequence and/or the video comprises a reproduction of the security feature from different viewing and/or illumination angles.

It can thus be demonstrated to the user how, for example, an optically variable security feature has to behave when the document is tilted and/or rotated.

The hand-held device can also capture and evaluate an actual state of a security feature by means of an external or integrated optical camera. This actual state can then be compared with a previously stored reference state. In particular, it is possible to carry out color analyses, typeface analyses, brightness analyses, contrast analyses and others on the security feature and/or on the first item of information.

A biometric recognition can also be effected using the camera, by capturing an actual state of the person in question and then comparing this with the information on the document, in particular with the first item of information, e.g. in the form of a photograph, and/or with the second item of information, e.g. in the form of electronically stored biometric features.

During a check of the security document, an up-to-date scan of the biometric features can preferably be recorded. If the biometric features in the first and/or the second item of information are stored as a template, then it is advantageous if the recorded scan is converted into such a compressed and/or reduced, but up-to-date template and then compared with the template stored on the security document, in particular in the first and/or the second item of information.

However, it is also possible that images or photographs of the users are stored in the first and/or the second item of information. In order to keep the data volume as small as possible, the photographs are preferably stored in low or coarse resolution. During the check of the security document, it is then advantageous that the reader, in particular the mobile hand-held device, reads the first and/or the second item of information and newly generates the image with the low resolution and in particular displays it on the reader, for example the mobile hand-held device or a piece of hardware connected or linked thereto. The image can hereby be evaluated well by the checker. The read image can then be compared with an up-to-date recorded image of the user and/or the checker compares the read image directly with the user standing before him, namely by visual inspection of the user.

During the check, one and the same mobile hand-held device can simultaneously read the template of the security document and likewise carry out the up-to-date scan of the biometric features. The check of the security document can thereby be made much easier and speeded up.

In addition, a probability calculation could in particular be calculated and output in the hand-held device, as to what the probability (e.g. 93%) is that this is an authentic document and/or security feature and/or item of information. This would be a practicable solution, instead of a yes/no analysis, e.g. when very many documents are checked within a very short time.

The first item of information and/or the second item of information can be arranged on the same side of the security document or on different sides and/or at different positions of the security document. For example, in the case of a security document in card form, the first and the second item of information can be arranged on the front or the back of the security document. However, one of the two items of information can also be arranged on the respectively opposite side. In the case of a security document in book form with several individual pages, the first and the second item of information can be arranged together on the same side of an individual page or on different individual pages. For example, the first item of information can be arranged on one individual page and the second item of information on another individual page, in particular within a visa arranged or applied there.

The first item of information and/or the second item of information can also be arranged in a transparent window area of the security document. It can be provided for example that the first item of information is thus visually recognizable from the front and/or from behind and/or in transmission. Alternatively or additionally, the second item of information can be arranged inside the window.

The security document can advantageously have at least one microcode. The microcode is in particular a project-specific feature. This is to be understood in particular as meaning that security documents of a specific type, for example security documents of a certain type, such as passports, or security documents from the same authority, have the same microcode.

The microcode is preferably formed such that it cannot be resolved by the human eye, thus is not recognizable. The microcode preferably has a structure size between 0.5 µm and 300 µm, preferably between 1 µm and 100 µm, in particular preferably between 1 µm and 50 µm. The microcode can be formed as a QR code. The microcode is preferably formed of a very finely structured partial metallization and/or a very finely structured color layer. The microcode is preferably covered by an optically variable element. The optically variable element here can be formed such that it optically outshines or otherwise optically conceals the microcode in order to make it difficult to be able to recognize the microcode with the naked human eye.

During the check of the security document, the microcode is preferably read by means of the reader. The reader here preferably compares the read microcode with other information stored in the security document, in particular with the document type of the security document and/or the country of issue of the security document. In particular, the data, in particular personal data, stored on the security document are not displayed until it is confirmed that the microcode matches or corresponds to the data to be compared on the security document, in particular the document type and/or the country of issue.

In principle, it is also possible that the microcode is furthermore stored in the chip of the security document. It can hereby be ensured that the correct chip is arranged on the security document. During the reading of the security document, the microcode in the security document is compared with the microcode in the chip.

The microcode is preferably introduced into a film, in particular a transfer film, which does not comprise any individualized features, such as for example personal features and/or biometric features. In particular, known demetallization methods and/or color-structuring methods for producing a very finely structured partial metallization and/or a very finely structured color layer are suitable for producing the microcodes. A very fine structuring of the microcodes can hereby be achieved. During the individualization, personal data are then introduced into the film. This is done in particular by laser engraving.

BRIEF DESCRIPTION OF THE DRAWINGS

The invention is now explained in more detail by reference to embodiment examples. There are shown in.

DETAILED DESCRIPTION

Figure 1:
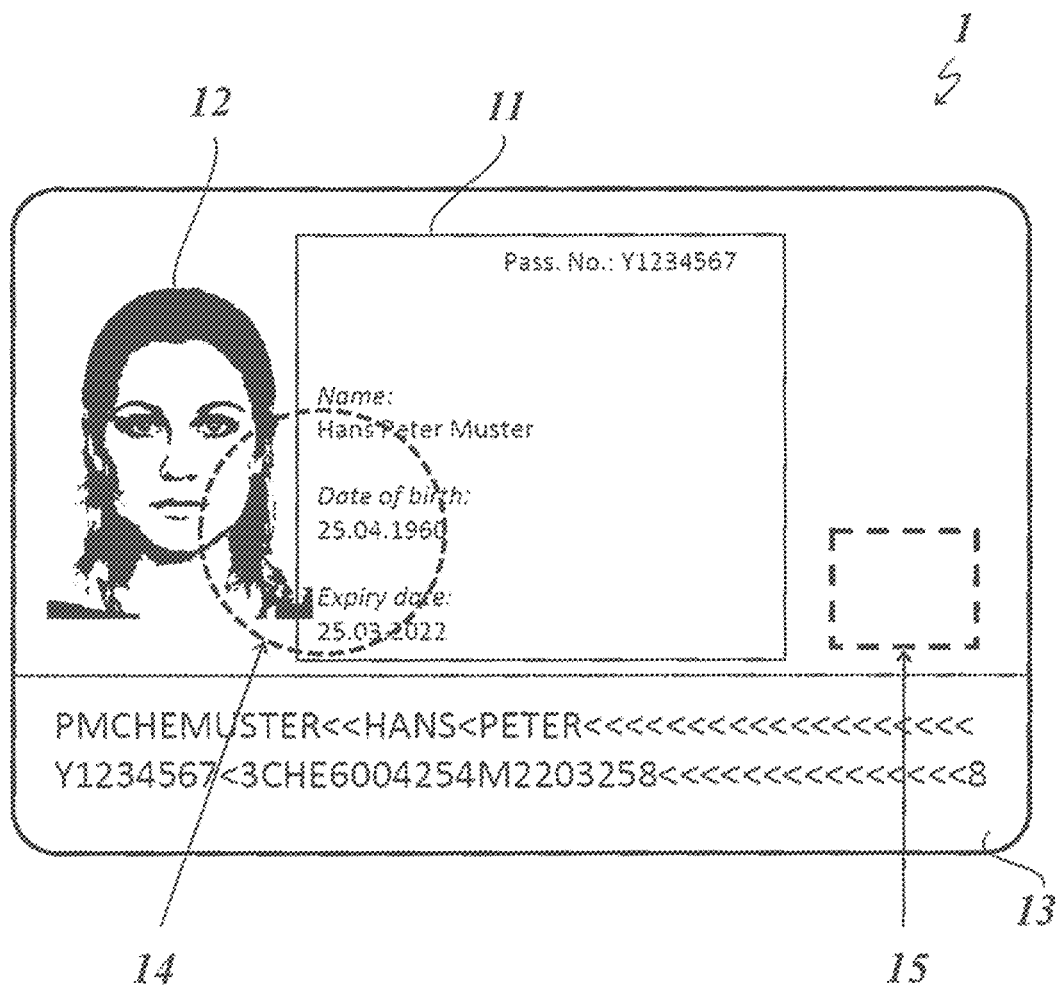
FIG. 1 a schematic representation of an embodiment example of a security document.

A security document 1 in the form of a personal identity card comprises an area 11 with readable identity data, a passport photograph 12, and a standardized machine-readable zone 13. The area 11 and the passport photograph 12 are partially overlapped by an optically variable security element 14. A machine-readable security element 15 is additionally provided.

The area 11 comprises personalized data relating to a holder of the security document. These can be, for example, the name of an identity card holder, biometric data, passport photographs, issue and validity dates, nationality, a chassis number or type classification of a motor vehicle associated with the security document, or the like.

These data are also at least partially reproduced in the machine-readable zone 13. By a machine-readable zone 13 is meant here an area of the document which complies with ICAO document 9303, part 3.

The machine-readable security element 15 is preferably formed as a code, in particular as a one- or two-dimensional barcode, in particular as a DataMatrix code, QR code, Aztec code, UPC (Universal Product Code), Code 128, Code 39 or PDF417 code. Such codes can preferably be formed as a diffractive code. Further encoding possibilities for the second security element are for example surface patterns, dot patterns, in particular pixel patterns, numerical codes, special proprietary barcodes such as e.g. color barcodes or three-dimensional barcodes, codes which are written into storage media such as e.g. in volume holograms. Codes based on magnetic storage media (magnetic strips, magnetic inks) as well as codes applied by fluorescent inks (for example UV-fluorescent inks), IR upconverters, polarizing optical elements can alternatively or additionally used. For the optical or electronic reading, additional methods may be required, such as UV illumination, electronic readers for magnetic codes, optical filters which are placed on the document or which are held e.g. in front of the camera lens (e.g. polarization filters, moiré analyzers).

A high information density can hereby be provided in a small space. In particular in the case of a diffractive barcode, there is at the same time an optical security effect which additionally impedes forgery. The diffractive optical effect in the case of a diffractive barcode can provide the actual encoding or form an additional item of encoded information or provide a merely decorative optical effect which contains no encoded information. The decorative effect can also be combined with an item of encoded information.

The security element 14 preferably comprises, individually or in combination, a diffractive structure, a zero-order diffraction structure, a blazed grating, a macrostructure, in particular a lens structure or microprism structure, a mirror surface, a matte structure, in particular an anisotropic or isotropic matte structure, a volume hologram or a thin-film structure with color-change effect.

It is further preferred if the security element 14 comprises a reflective layer, in particular a whole-surface or partial metal layer and/or a whole-surface or partial layer made of a high refractive index (HRI) material.

It is additionally expedient if the security element 14 comprises single- or multi-layered printed structures, in particular comprising colored, optically active and/or optically variable dyes and/or pigments.

Such structures can only be reproduced with difficulty and therefore provide a particularly good level of protection against forgery. At the same time, a variety of appealing optical effects can thus be achieved. As the security element 14 overlaps the area 11 and the passport photograph 12 at least in areas, it is not possible to manipulate these elements without destroying the security feature 14.

Figure 2:
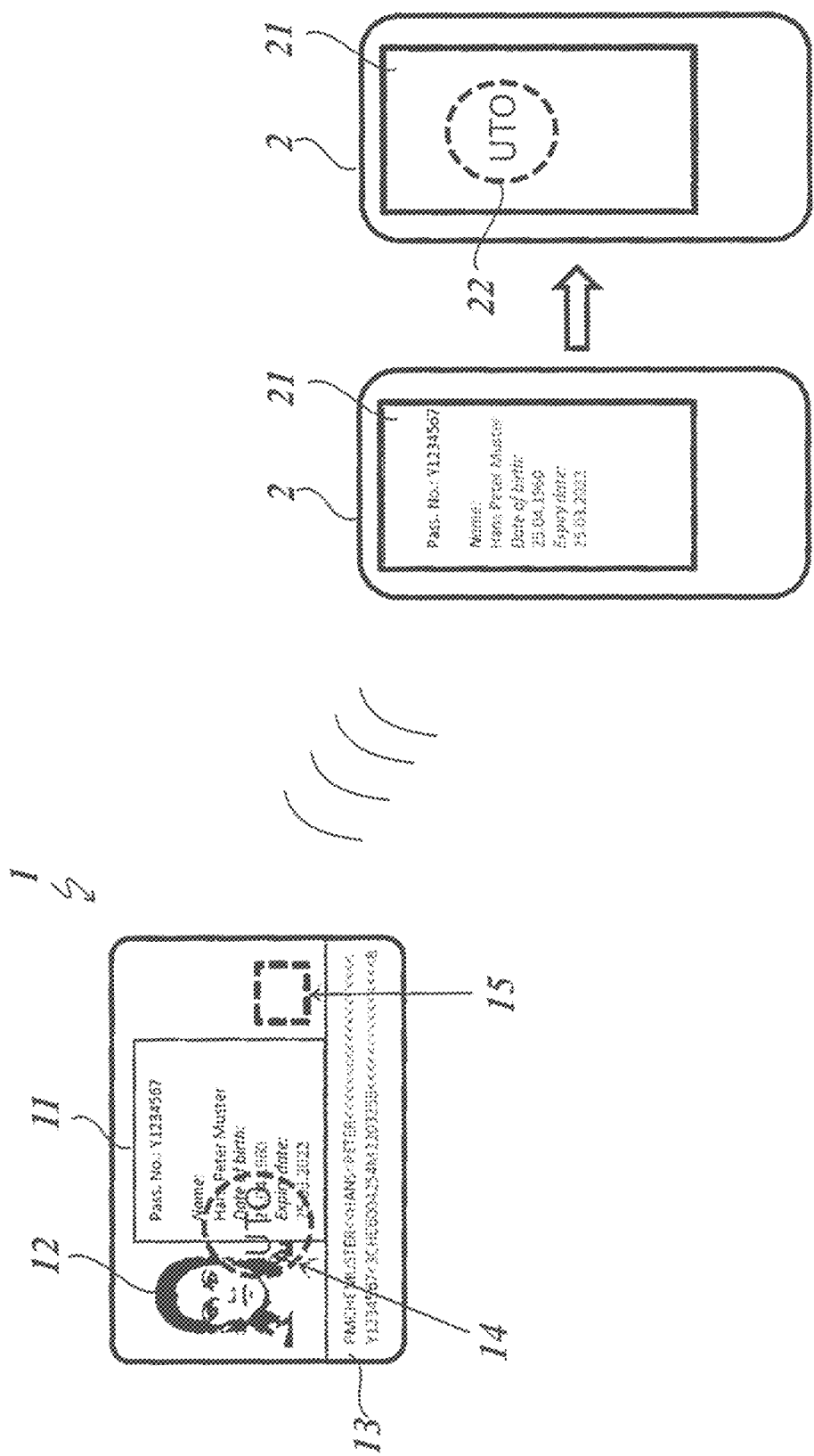
FIG. 2 a schematic representation of the method sequence during the verification of a security document.

As FIG. 2 shows, the document 1 can be captured for authentication using a hand-held device 2, for example a smartphone, with an integrated camera. A corresponding piece of software of the hand-held device captures both the information from the areas 11, 12 and 13 and the machine-readable information of the security element 15.

The information read from the security element 15 can then be displayed on a display 21 of the hand-held device. The user can now check whether this information is consistent with the printed information in the area 11 or whether it, or also the passport photograph 12 or the machine-readable zone 13, has been manipulated.

Furthermore, a reproduction 22 of the security element 14 can also be displayed on the display 21. This serves to assist the user, in order to make it easier for him to identify a correct and not manipulated security element 14. Further information, such as for example the earliest possible date of issue of the document (date of being brought into circulation), can additionally be displayed.

The security element 15 can furthermore contain still further information or perform further functions. It is particularly advantageous if the security element 15 comprises a key or a part of a key for decoding an item of encrypted information contained in the areas 11 or 13.

A particularly high level of protection against forgery is achieved by such an encryption method. For example, the item of information contained in the security element 15 can be the public key of an asymmetric key pair, which acts as a digital signature for a part of the areas 11 or 13 encoded with the private key of the key pair. It is then not possible to manipulate these areas without knowing the private key. For example, the Elliptic Curve Digital Signature Algorithm (ECDSA) and/or, for example, SHA-256 hash algorithm are particularly suitable.

It is likewise possible that the security element 15 comprises a checksum for an item of information contained in the areas 11, 12 or 13. Through such a checksum it is ensured that manipulations on these areas can be recognized immediately. For example, a checksum can comprise several check digits, which are each generated from individual biographical data elements of the security document, such as for example name, date of birth, etc. ICAO document 9303 as well as the equivalent ISO standard 7501, part 1-3 describe an example of a standardized formula for calculating such check digits. However, non-standardized and optionally confidential methods can also be used.

Figure 3:
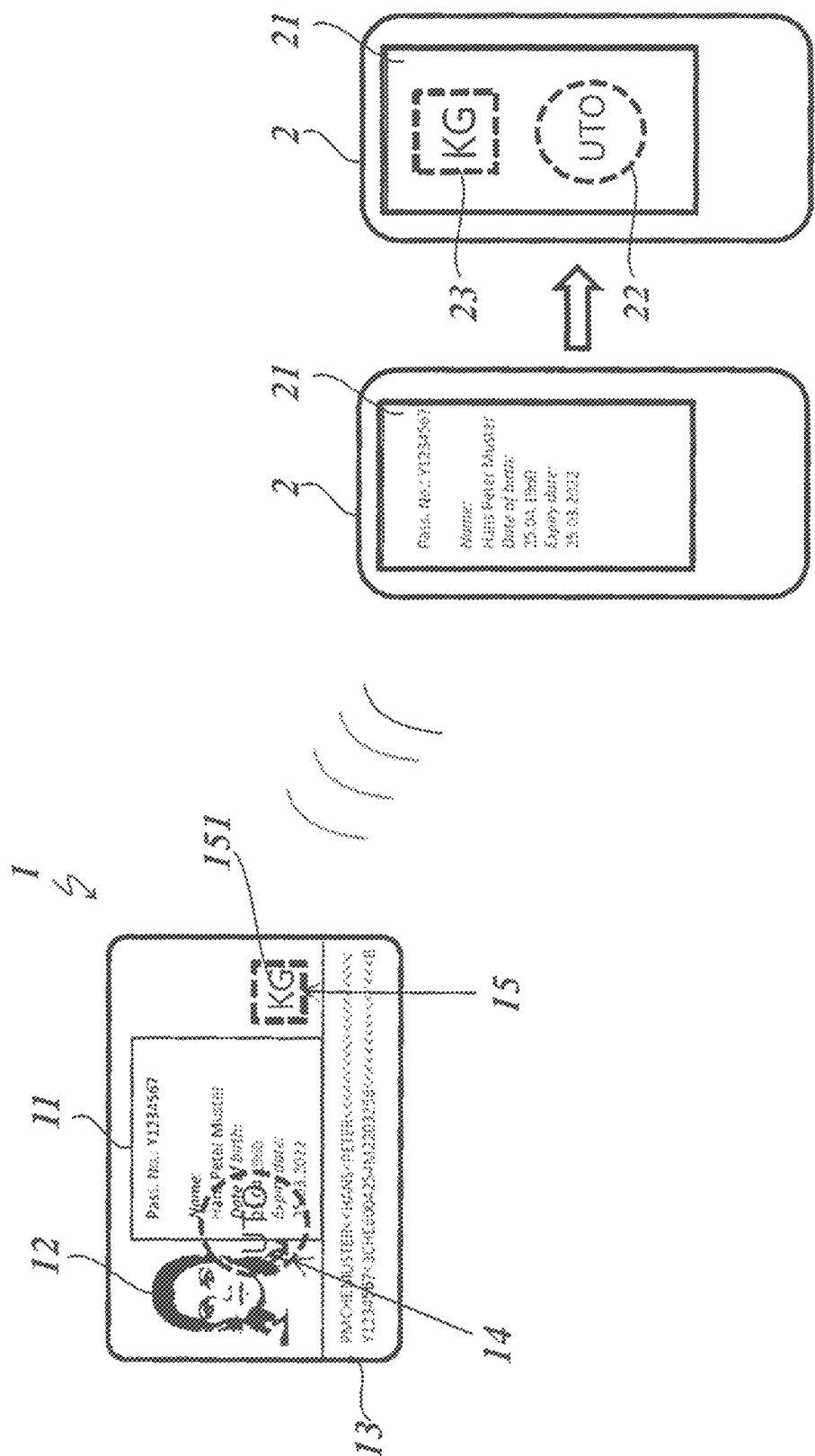
FIG. 3 a schematic representation of the method sequence during the verification of an alternative security document.

In the embodiment according to FIG. 3 the security element 15 comprises another additional optically variable structure 151. This can likewise be displayed during the verification as a reference reproduction 23 on the display 21 of the hand-held device, which further increases the level of protection against forgery of the document 1.

The optically variable structure 151 likewise preferably comprises, individually or in combination, a diffractive structure, a zero-order diffraction structure, a blazed grating, a macrostructure, in particular a lens structure or microprism structure, a mirror surface, a matte structure, in particular an anisotropic or isotropic matte structure, a volume hologram or a thin-film structure with color-change effect.

It is further preferred if the optically variable structure 151 comprises a reflective layer, in particular a whole-surface or partial metal layer and/or a whole-surface or partial layer made of a high refractive index (HRI) material and/or single- or multi-layered printed structures, in particular comprising colored, optically active and/or optically variable dyes and/or pigments.

As already described, security elements 15 which are visually appealing and particularly secure against forgery can thus be produced.

Figure 6:
FIG. 6 a schematic representation of an alternative embodiment example of a security document with RFID chip.

A detailed view of such a document 1 is reproduced again in FIG. 6.

Figure 4:
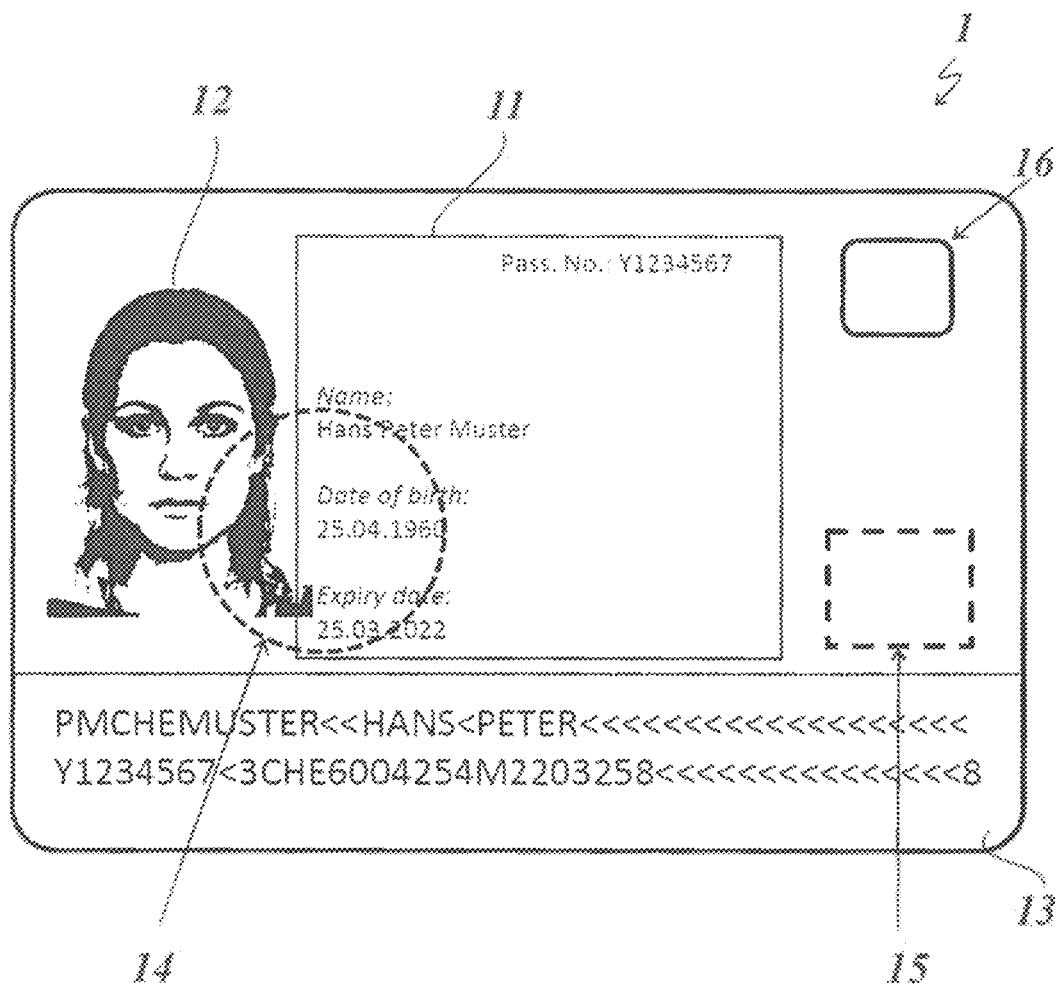
FIG. 4 a schematic representation of an embodiment example of a security document with RFID chip.

In the embodiment of the security document 1 according to FIG. 4 an RFID chip 16 is additionally provided on the security document 1. A redundant copy of the information from the areas 11, 12, 13 for example can be stored in the RFID chip 16. This is preferably encrypted, wherein an item of information present in the security element 15 can serve, in the manner already described, as a key for access to the information of the RFID chip.

Figure 5:
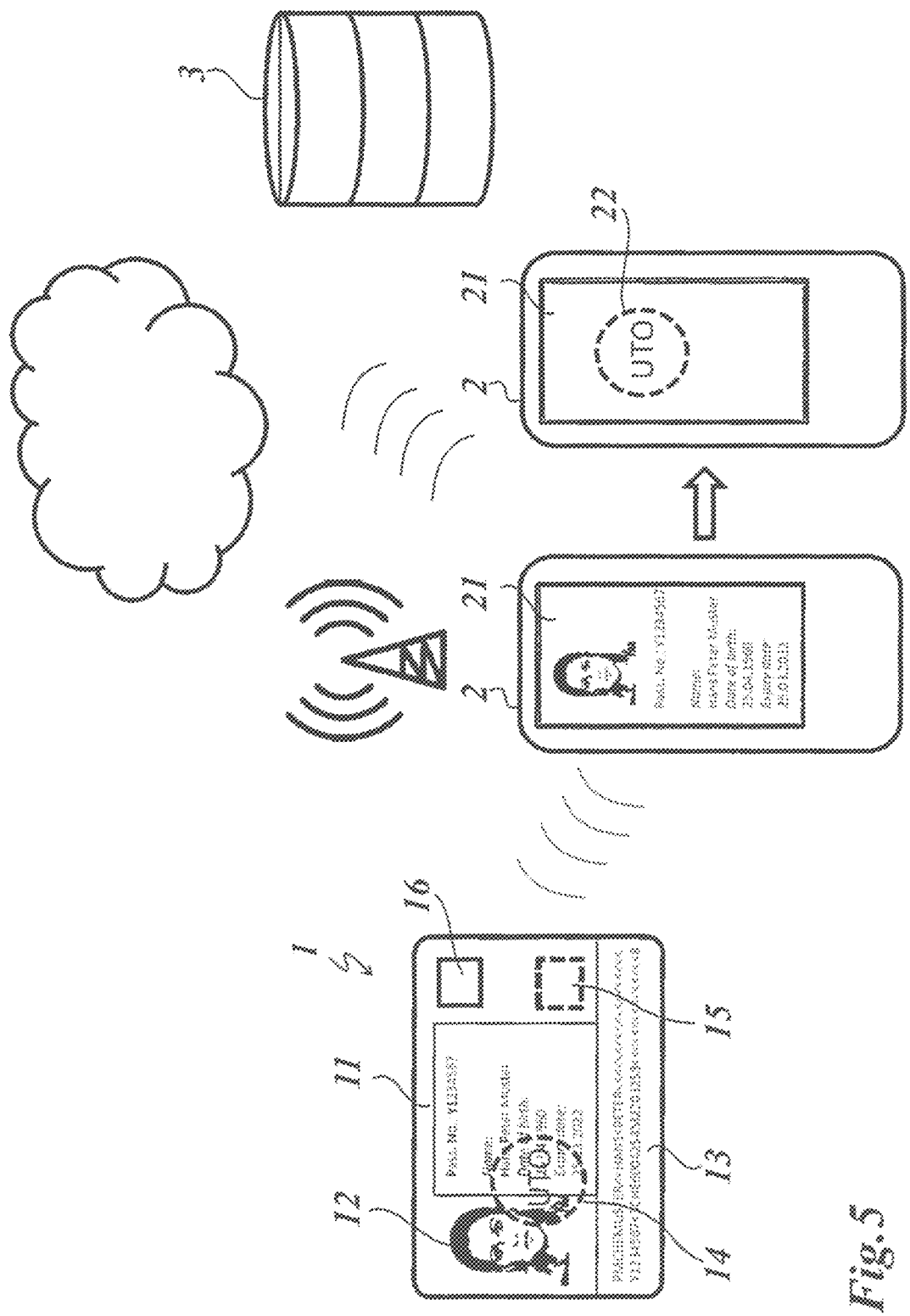
FIG. 5 a schematic representation of the method sequence during the verification of a security document involving an external database.

A query of an external database 3 can additionally be performed, as FIG. 5 shows, by the hand-held device 2. An item of information stored in the security element 15 or in the chip 16 can serve as a password or access key for the database 3. Information from both elements can also be supplemented in order to achieve a particularly high level of security.

The database 3 can in turn provide a copy of the data from the areas 11, 12, 13, supply reproductions 22 of the security elements 14, 15 in the described manner or also provide further keys or checksums for verifying the document 1.

Figure 7:
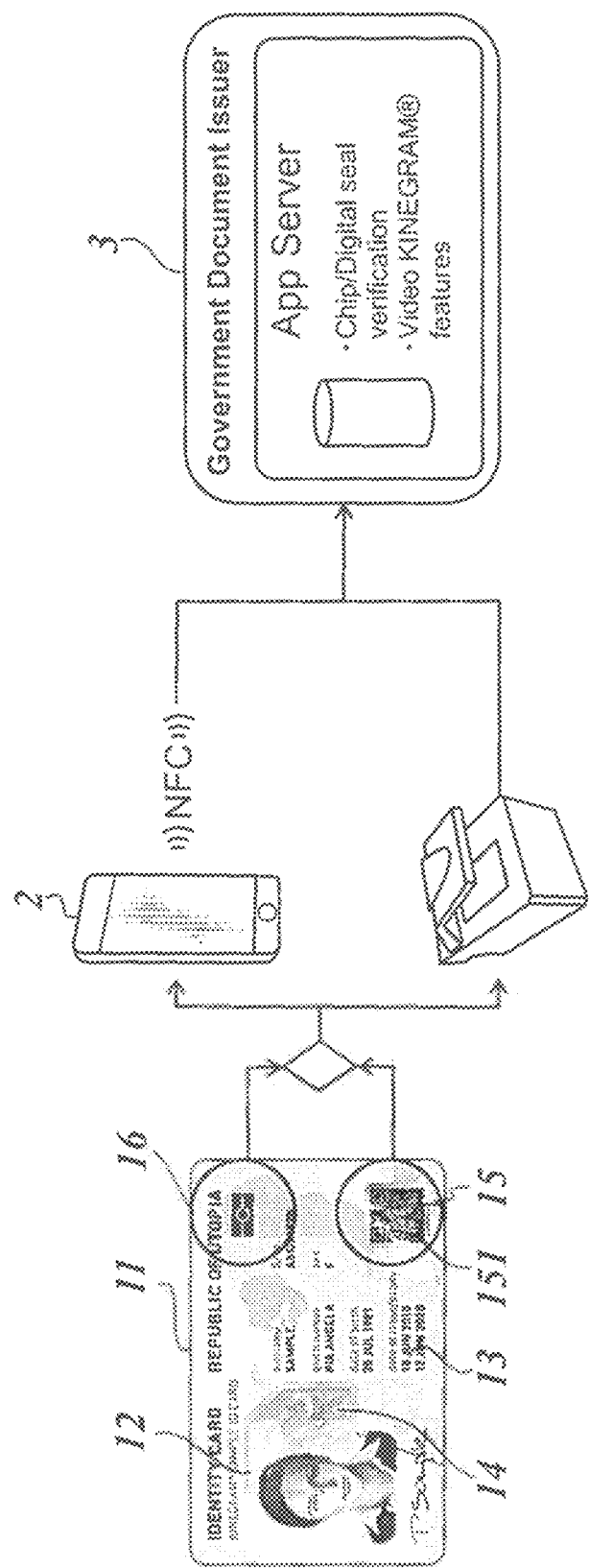
FIG. 7 a schematic representation of the method sequence during the verification of a security document according to FIG. 6 involving an external database.

The method sequence for this is illustrated again in FIG. 7. The information of the security elements 15 and 16 is captured and optionally decrypted by the hand-held device 2. The biographical information of the identity card holder stored in the chip 16 is now displayed and can be compared with the information applied in the area 11. An electronically stored passport photograph can optionally also be displayed and compared with the passport photograph 12. Manipulations in the areas 11 and 12 can hereby already be recognized.

At the same time, the hand-held device accesses the database 3 and from there also downloads a copy of the biographical data of the identity card holder. These are now likewise displayed and can likewise be compared with the data stored in the document 1. Thus, it is also possible to recognize a forgery when both the areas 11 and 12 and the security element 15 and the chip 16 are manipulated.

The hand-held device furthermore also obtains the already explained reproduction 22, 23 of the security elements 14, 151 from the database 3 or from the memory in the chip 16 in the security document 1 or from the memory in a chip in the hand-held device 2 and displays it to the user. An item of information of the security element 15 can here be used as an access code or password for the respective database or the respective chip. The respective security element here is preferably represented at several viewing angles, in order thus to demonstrate the optically variable effects of the security elements 14, 151 and to make it easier to verify them.

Figure 8:
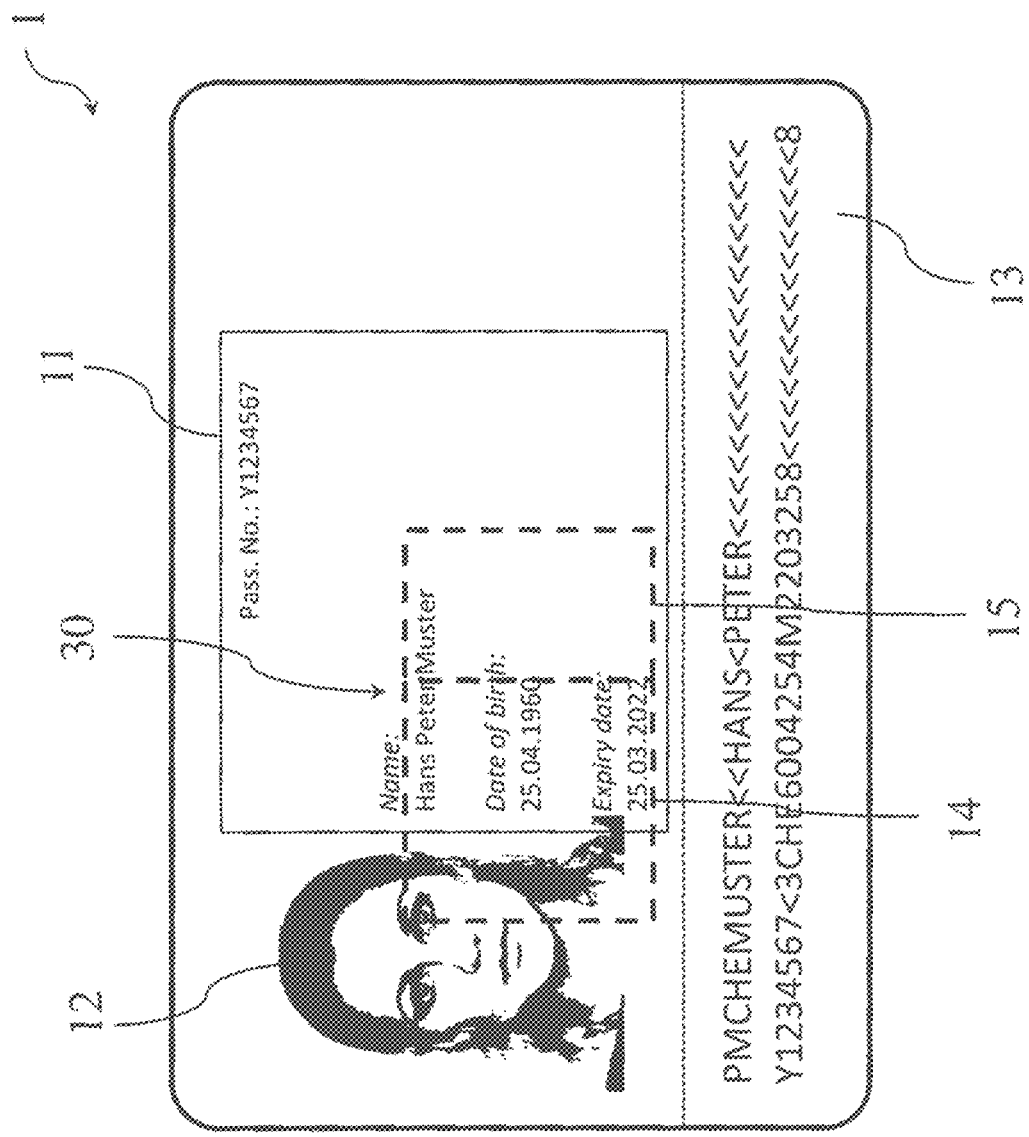
FIG. 8 a schematic representation of a further embodiment example of a security document.

FIG. 8 shows a further embodiment example of a security document 1. The machine-readable security element 15, which preferably has a machine-readable code, directly adjoins the security element 14, which preferably has an optically variable element. The security elements 14, 15 can be regarded according to the invention as a combined security element 30. It is advantageous if the security elements 14, 15 are formed as a common patch. The security elements 14, 15 can hereby be applied to a substrate of the security document 1 in a single application step.

In FIG. 8 the combined security element 30 overlaps both the area 11 with readable identity data and the passport photograph 12. This has the advantage that it is possible to manipulate the area 11, as well as the passport photograph 12, only by destroying the combined security element 30. However, it is also conceivable that only one of the security elements 14, 15 overlaps the area 11 and/or the passport photograph 12.

The invention claimed is:

1. A security document with a first security element, which comprises a first item of visually recognizable and machine-readable information, and a second security element, which comprises a second item of machine-readable information which can be used to verify the first item of information,
    wherein the first the second security element, individually or in combination, comprises an optically variable element, and
    wherein the optically variable element adjoins the second item of information or a further item of information and overlaps the first item of information at least in areas, or wherein the optically variable element adjoins the first item of information and overlaps the second item of information at least in areas, and
    wherein the optically variable element comprises a diffractive structure, a zero-order diffraction structure, a blazed grating, a macrostructure, a lens structure or microprism structure, a mirror surface, a matte structure, a volume hologram or a thin-film structure with color-change effect.

2. The security document according to claim 1, wherein the first item of information comprises personalized data relating to a holder of the security document or an object associated with the security document.

3. The security document according to claim 1, wherein the first security element comprises a printed or laser-engraved inscription or a photograph or a machine-readable zone (MRZ) of an identity document or an RFID chip.

4. The security document according to claim 1, wherein the second security element is formed as a one- or two-dimensional barcode.

5. The security document according to claim 1, wherein the second item of information comprises a key or a part of a key for decoding the first item of information.

6. The security document according to claim 1, wherein the second item of information comprises a checksum for the first item of information.

7. The security document according to claim 1, wherein the second item of information comprises a redundant reproduction of at least a part of the first item of information.

8. The security document according to claim 1, wherein the second item of information comprises a password for database access or for access to an RFID chip.

9. The security document according to claim 1, wherein the second item of information comprises an item of information about a reference state of a security feature of the first security element.

10. The security document according to claim 1, wherein the first or the second item of information comprises biometric features.

11. The security document according to claim 1, wherein the optically variable element directly adjoins the second item of information or a further item of information, or wherein the optically variable element directly adjoins the first item of information.

12. The security document according to claim 1, wherein the first or the second security element comprises a reflective layer, a whole-surface or partial metal layer or a whole-surface or partial layer made of a high refractive index (HRI) material.

13. The security document according to claim 1, wherein the first and the second security element are arranged adjacent to each other and form a combined security element.

14. The security document according to claim 1, wherein the first security element or the second security element in each case have at least two partial areas, wherein in each case the first or second item of information is contained or stored in a first partial area and a second partial area comprising an optically variable element, is provided adjacent to the first partial area or surrounding the first partial area.

15. The security document according to claim 14, wherein at least the second partial area of the first security element overlaps the first partial area of the security element, at least in areas or at least the second partial area of the second security element overlaps the first partial area of the security element, at least in areas.

16. The security document, according to claim 1, further comprising at least one microcode, which comprises a structure size between 0.5 μm and 300 μm.

17. The security document according to claim 1, wherein the security document is formed as an identity document, visa document, driver's license, motor vehicle registration document.

18. A security document with a first security element, which comprises a first item of visually recognizable and machine-readable information, and a second security element, which comprises a second item of machine-readable information which can be used to verify the first item of information,
    wherein the first and the second security element are arranged adjacent to each other and form a combined security element and at least one of the security elements comprises an optically variable element, and
    wherein the optically variable element comprises a diffractive structure, a zero-order diffraction structure, a blazed grating, a macrostructure, a lens structure or microprism structure, a mirror surface, a matte structure, a volume hologram or a thin-film structure with color-change effect.

19. A security document with a first security element, which comprises a first item of visually recognizable and machine-readable information, and a second security element, which comprises a second item of machine-readable information which can be used to verify the first item of information,
    wherein the first security element or the second security element in each case have at least two partial areas, wherein, in each case, the first or second item of information is contained or stored in a first partial area and a second partial area, comprising an optically variable element, is provided adjacent to the first partial area or surrounding the first partial area, and
    wherein the optically variable element comprises a diffractive structure, a zero-order diffraction structure, a blazed grating, a macrostructure, a lens structure or microprism structure, a mirror surface, a matte structure, a volume hologram or a thin-film structure with color-change effect.

\* \* \* \* \*

UNITED STATES PATENT AND TRADEMARK OFFICE
CERTIFICATE OF CORRECTION

PATENT NO. : 11,840,110 B2
APPLICATION NO. : 17/362007
DATED : December 12, 2023
INVENTOR(S) : John Anthony Peters et al.

Page 1 of 1

It is certified that error appears in the above-identified patent and that said Letters Patent is hereby corrected as shown below:

In the Claims

Column 13, Line 21:
Now reads: "wherein the first the second security element, individually"
Should read: --wherein the first or the second security element, individually--

Signed and Sealed this
Fifteenth Day of April, 2025

Coke Morgan Stewart
*Acting Director of the United States Patent and Trademark Office*